Sept. 1, 1931.     J. A. E. MADORE     1,821,762
DRAFT CONNECTION
Filed Dec. 7, 1928
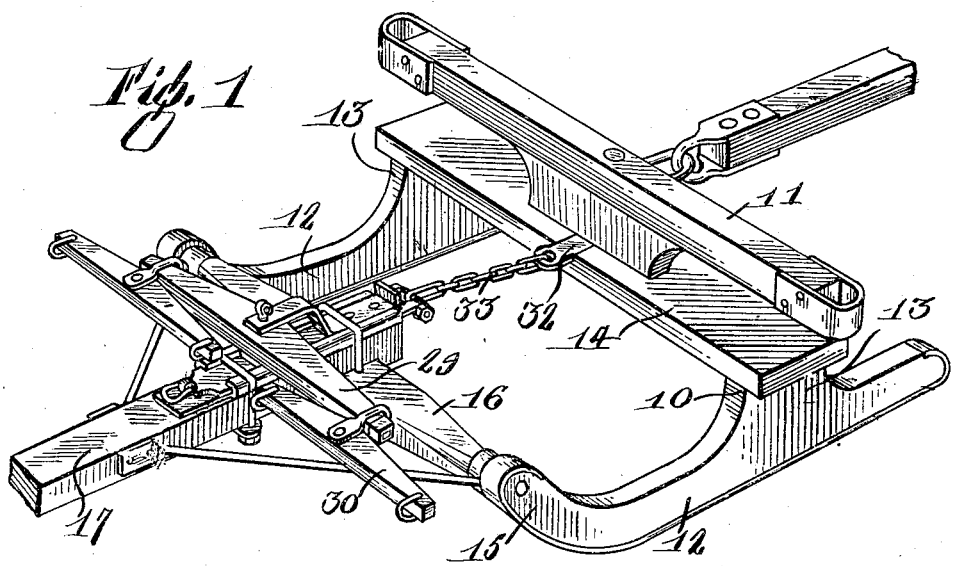
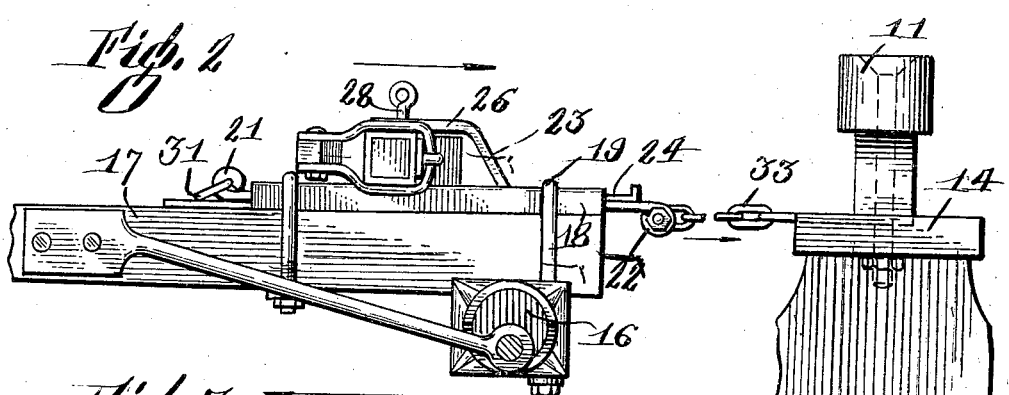
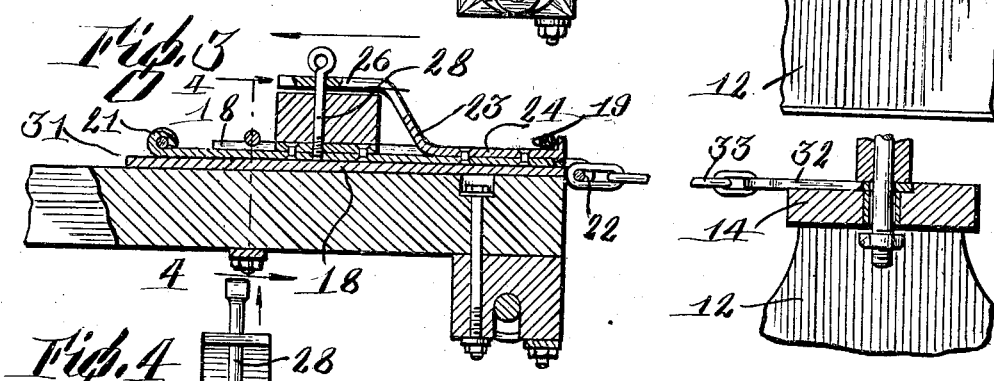
J. A. Ernest Madore, Inventor
By Marion & Marion, Attorneys Patented Sept. 1, 1931

1,821,762

UNITED STATES PATENT OFFICE

JOSEPH ANTONIN ERNEST MADORE, OF MONTREAL, QUEBEC, CANADA

DRAFT CONNECTION

Application filed December 7, 1928, Serial No. 324,488, and in Canada October 17, 1928.

The present invention relates to improvements in draft connections for vehicles and has particular reference to a connection adapted especially for runner vehicles.

An important object of the invention is the provision of a vehicle draft connection wherein the whiffletree connection will be durably connected with the main cross bar of a sled.

A further object of the invention is the provision of a draft connection embodying a whiffletree support member slidably mounted on the vehicle pole or pole bar and connected by means of a flexible connecting member with the main cross bar of a sled.

Another object of the invention is the provision of a draft connection in which the primary pull will be exerted directly on the main cross bar of a sled.

Still another object of the invention is the provision of a connection of the above type which will be comparatively simple and durable of construction and efficient in use.

Other objects and advantages of the invention will become apparent as the description progresses.

In the accompanying drawings forming a part of this specification and in which like reference characters are employed to designate corresponding parts throughout the same:

Figure 1 is a perspective view of the draft connection associated with a sled,

Figure 2 is a side elevational view of the same, with the connection in retracted position, Figure 3 is a similar view showing the connection in extended position, and Figure 4 is a transverse section taken on the line 4—4 of Figure 3.

Referring to the drawings, wherein for the purpose of illustration is shown a preferred embodiment of the invention, the numeral 10 generally designates a sled of the type commonly employed on runner vehicles. This sled forms the forward runner section of a pair employed to support a vehicle body. The sled 10 is pivotally connected for steering movement with a transverse body brace 11 and embodies a pair of transversely opposed runners 12 formed at their intermediate portions with upwardly projecting side boards 13.

Secured on the upper edges of the side boards 13, and extending transversely in a horizontal plane, is a main cross bar 14 usually formed at its centres with an opening adapted to receive therethrough the lower end of a pivot pin.

The forward ends of the runners 12 are formed with upturned extensions 15, the extremities of which support a transverse pole or tongue bar 16 to the central portion of which is attached a forwardly extending pole 17.

Heretofore, it has been customary to connect the whiffletrees or other draft members directly on the inner end of the pole bars or on the pole bar 16. This type of draft connection necessitates the provision of an extremely durable tongue bar, and, furthermore, renders quite difficult the steering movement of the forward sled.

The essential feature of the present invention resides in the provision of a draft connection wherein the direct pull or thrust will be taken by the main cross bar 14. This is effected by providing an elongated metallic channelled guide member 18 on the upper rear end portion of the tongue. To secure the member 18, adjacent the forward and rear ends thereof, are downwardly projecting U-shaped brackets 19. Slidably positioned in the strip 18, and designed to move longitudinally therein, is an elongated flat bracket bar 20 provided at the forward end with an upturned link engaging loop 21. At the rear end, the bracket bar 20 is formed with a downturned loop 22. A complementary bracket bar 23 is secured on the bar 20, the bar 23 embodying a flat rear extension 24 lying on the rear portion of the bar 20 and riveted thereto. The loop 22 is arranged to engage the rear part of the member 17 in the extended position of the bracket to limit the movement thereof. At the forward end, the member 23 is formed with upwardly offset forward extensions 26 arranged parallel with and above the intermediate portion of the bar 20. Adjacent the extremity of the extension 26 is formed a bolt receiving opening formed to register vertically with complementary openings in the bar 20 to slidably receive therein a king bolt 28.

In operative arrangement, the king bolt 28 passes through an opening in the centre of a doubletree 29, to the ends of which are secured swingletrees 30. A forwardly extending link 31 is connected to the loop 21 for use where more than two draft animals are required to pull the vehicle.

Secured to the medial portion of the sled cross bar 14, and projecting forwardly therefrom, is a tie bar 32 formed with an eye on its forward extremity. A connecting member, preferably in the form of a chain 33, connects the eye of the tie bar 32 to the rear extremity of the bracket bar 20, as shown to advantage in Figures 2 and 3. The chain is formed so that the bracket member, composed of the bars 20 and 23, can be extended slidably on the pole 17 to a position shown in Figure 3, preventing, however, actual contact of the projection 25 and the loop 22 with the structure fixed on the rear end of the pole, so that the pull on the doubletrees will be entirely exerted on the tie bar 32 attached to the main cross bar of the sled.

Thus, in use the draft bracket will be free to slide longitudinally on the pole within certain limits. The retracted or rearward movement will be limited by the loop 21 formed on the forward end of the bottom bracket bar 20. The extension or forward movement will be restricted by the length of the chain which is designed to prevent direct connection of the bracket with the tongue. This construction is designed to impart the main draft pull or thrust directly on the main cross bar of the sled so as to relieve the forward pole bar 16 of the direct draft tension. This arrangement will produce a better distribution of the pull and result in a more efficient operation of the vehicle.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

In a draft arrangement for sleds and like vehicles, the combination with a sled having runners, a transverse cross bar connecting the said runners, a transverse pole bar connecting the said runners at the forward end thereof, and a pole fixedly secured to the center of said pole bar, of rigid braces extending from each forward end of the runners to a common point on the pole, a whiffletree bracket mounted on the pole for longitudinal sliding movement, means to limit the movement of the bracket, a king pin for connecting the whiffletree to said bracket, means to securely support said pin at both ends thereof, and a flexible connecting member connecting the whiffletree bracket to the center of the cross-bar of the sled to impart the draft directly thereto.

In witness whereof I have hereunto set my hand.

JOSEPH ANTONIN ERNEST MADORE.